United States Patent [19]
Prescott

[11] 3,936,349
[45] Feb. 3, 1976

[54] NUCLEAR REACTORS
[75] Inventor: Robert Frank Prescott, Oadby, England
[73] Assignee: United Kingdom Atomic Energy Authority, London, England
[22] Filed: Dec. 27, 1973
[21] Appl. No.: 428,748

[30] Foreign Application Priority Data
Jan. 5, 1973  United Kingdom................... 858/73

[52] U.S. Cl.................................... 176/78; 176/81
[51] Int. Cl.².......................................... G21C 3/32
[58] Field of Search ............ 176/66, 67, 73, 76, 78, 176/81

[56] References Cited
UNITED STATES PATENTS
3,308,034  3/1967  Schmidt................................ 176/78
3,383,287  5/1968  Jackson ................................. 176/78

Primary Examiner—Stephen C. Bentley
Attorney, Agent, or Firm—Larson, Taylor and Hinds

[57] ABSTRACT

A nuclear reactor core comprises an array of closely packed components which include fuel elements and may include control rod guide tubes. The components are arranged with their longitudinal axes vertical and in groups. The components of each group are urged laterally into firm engagement with one another by tilting at least some of them towards the centre of the group. The fuel elements of the group have interlocking bearing pads to resist relative lateral movement of fuel elements.

8 Claims, 8 Drawing Figures

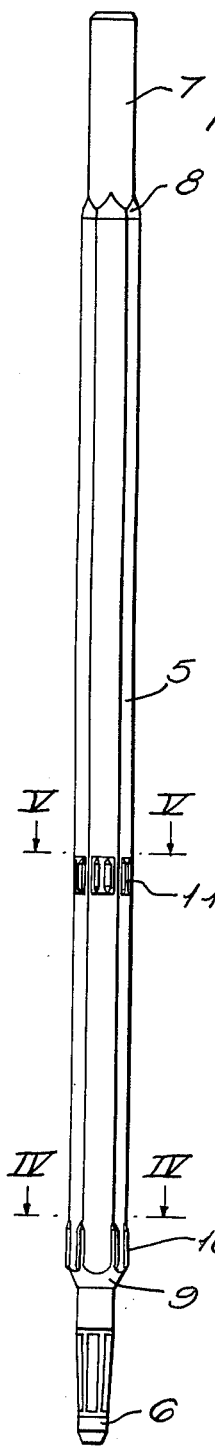
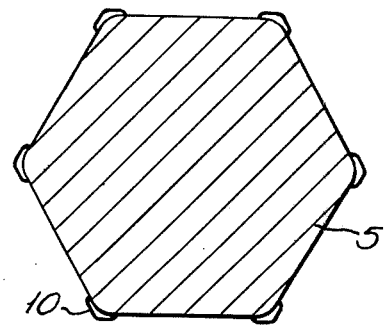
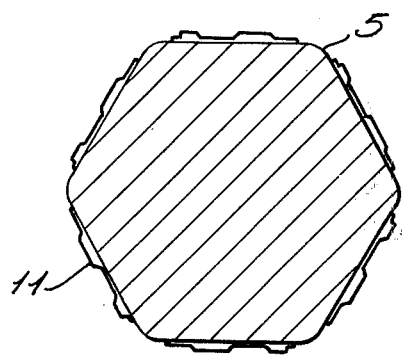

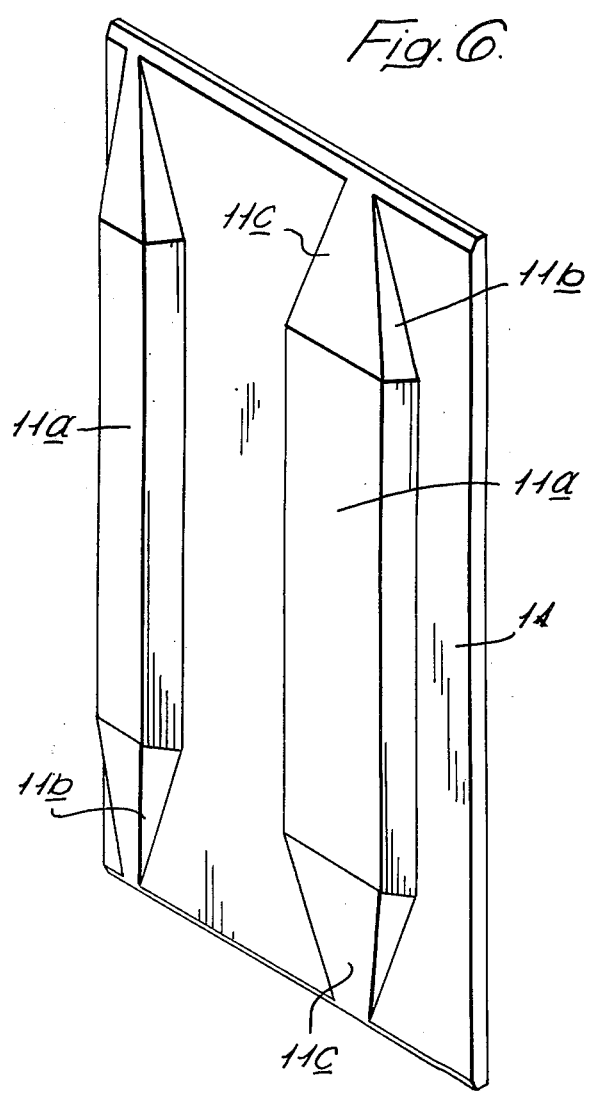

NUCLEAR REACTORS

BACKGROUND OF THE INVENTION

This invention relates to nuclear reactors of the kind having a core composed of closely packed parallel fuel elements which are provided with bearing pads at selected levels whereby the elements are firmly positioned against one another to prevent them rattling. Such a nuclear reactor core is disclosed in U.S. Pat. No. 3,383,287 and the fuel elements in that reactor core are arranged in groups in each of which each element is supported in such a manner as to tend to tilt the element towards the centre of the respective group whereby the elements of each group are urged laterally into firm engagement either with one another or with a structural member around which the group may be arranged. Thus the elements of each group are jammed together, and, where desirable, about a central post on which the surrounding elements lean.

SUMMARY OF THE INVENTION

According to the present invention, in a nuclear reactor core comprising an array of closely packed components which include fuel elements, the components being arranged with their longitudinal axes generally vertical in groups, at least some of the components in each of several groups are supported in such manner as to tend to tilt the components towards the centre of the respective group whereby the components of each group are urged laterally into abutment with one another, and the fuel elements have interlocking bearing pads intermediate their ends whereby relative lateral movement of two adjacent fuel elements is resisted. By reducing sideways slip of fuel elements the stability of of the reactor core is improved during refuelling operations.

The invention also resides in a nuclear reactor fuel element for a nuclear reactor core in accordance with the preceding paragraph, the fuel element comprising a cluster of parallel fuel pins enclosed by a peripheral wrapper of hexagonal cross-section, the bearing pads being in the form of spline-like ribs extending parallel to the longitudinal axis of the fuel element and interlockable with complementary ribs of pads on adjacent fuel elements in the group.

The invention is applicable to a nuclear reactor core wherein the components, which comprise fuel elements and control rods, are generally arranged in modules each module comprising a cluster of four components at least three of which are fuel elements, one fuel element being rigidly supported whilst the remaining components are resiliently tilted towards the centre of the cluster to lean on the rigidly supported element.

The invention is also applicable to a nuclear reactor core wherein the fuel elements are arranged in modules, each module comprising a cluster of six fuel elements, each resiliently tilted towards a central void to form a circular arch. The modules may include additional fuel elements disposed outside the cluster and resiliently tilted towards the central void. The central void may be used to accommodate a control rod.

By using a module arrangement of fuel elements wherein one element serves to support the remaining elements and control rods of the cluster, or wherein the elements lean on each other in a circular arch, the need for structural members to form leaning posts in the manner described in U.S. Pat. No. 3,383,287 is avoided. Such structural members are subject to irradiation embrittlement which could lead to failure within the core.

DESCRIPTION OF THE DRAWINGS

Constructional embodiments of the invention will now be described, by way of example, with reference to the accompanying drawings wherein:

FIG. 3 is a side view of a nuclear reactor fuel element,

FIG. 4 is a plan view of part of the fuel element shown in FIG. 3 and is a cross-section on line IV—IV of FIG. 3, FIG. 5 is a plan view of part of the element shown in FIG. 3 and is a cross-section on line V—V of FIG. 3, FIG. 6 is fragmentary detail of FIG. 3 drawn to a larger scale.

DESCRIPTION OF THE PREFERRED EMBODIMENTS

Figure 1:
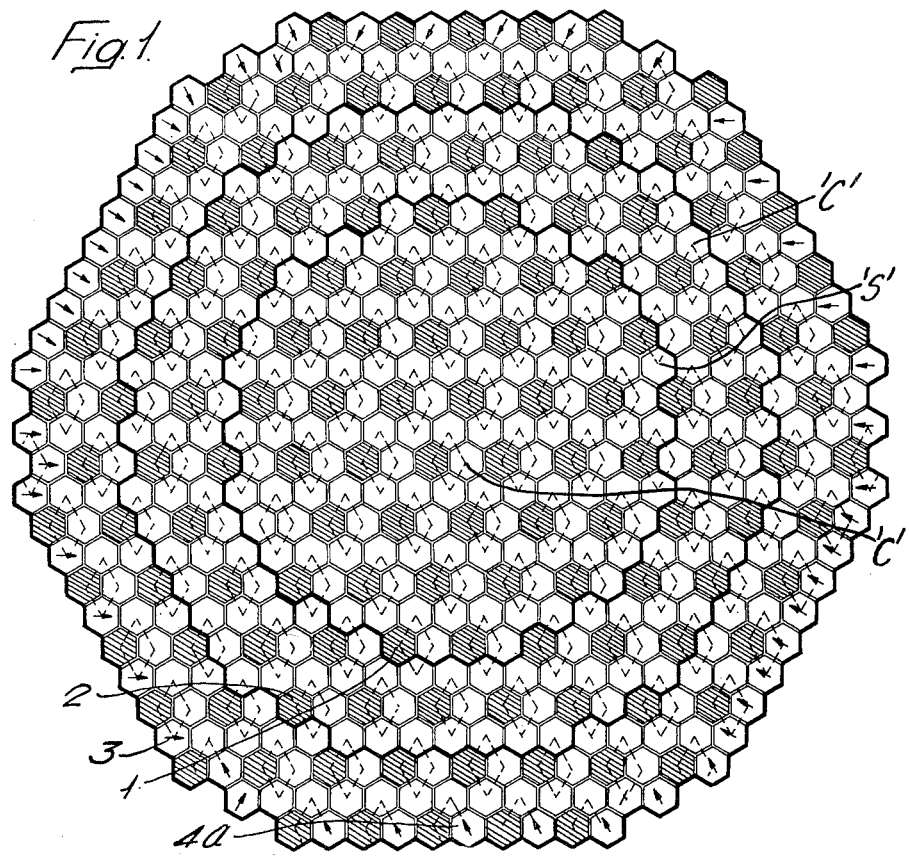
FIG. 1 is a diagrammatic plan view of a nuclear reactor core.
Figure 2:
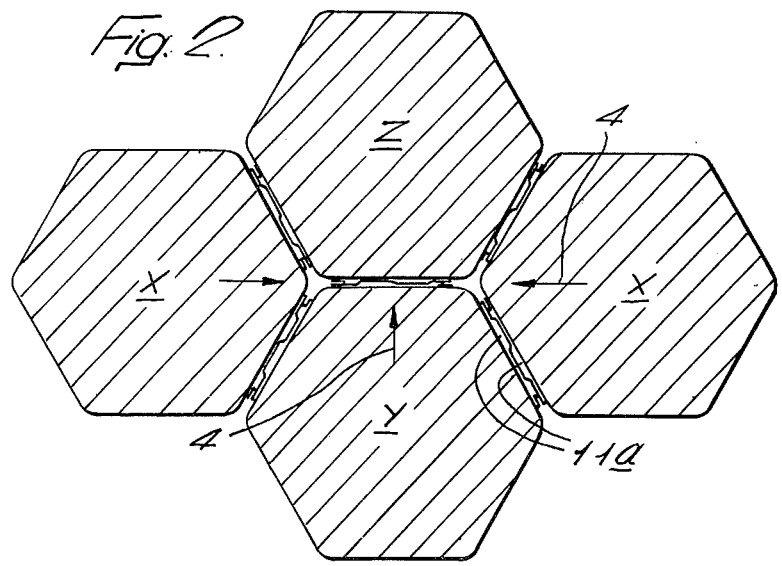
FIG. 2 is a detail of FIG. 1 drawn to a large scale

In FIG. 1 there is shown a fast neutron nuclear reactor comprising a central zone 1 having plutonium enriched fuel elements, an intermediate zone 2 having more highly enriched fuel elements and a zone 3 of breeder fuel elements. In addition to fuel elements the central and intermediate zone include some control rod guide tubes (only two being indicated and designated 'C') and the inner zone also includes some shut down rod guide tubes (only one being indicated and designated 'S'). Except at the periphery of the breader zone 3, the components are generally arranged in modules each comprising a cluster of four components of which at least three are fuel elements. One of the fuel elements of each module is rigidly supported in upright position whilst the remaining fuel elements are tilted towards the rigidly supported fuel element. Where one of the components of the module is a central rod guide tube it may be free standing or may lean on the fuel elements but does not have interlocking bearing pads. FIG. 2 shows a module of four components comprising types X, Y and Z wherein the component type Z is rigidly supported whilst components type X and Y are tilted towards the centre of the cluster as indicated by arrows designated 4. The rigidly supported components are indicated by cross-hatching in FIG. 1 and the four associated components of each module are indicated by broken lines. The arrows 4a in FIG. 1 indicate the loading direction of the components which are not in regular module. Either of components type 'X' can be a control rod or shut down rod guide tube but neither type 'Y' or type 'Z' can be so used; type Y is excluded because stability of the module depends on the interlocking afforded by this component during refuelling of type 'Z', and type Z is excluded because it defines the position of the module with respect to the remainder of the core.

The fuel elements, control rod guide tubes and shut down rod guide tubes are generally similar in outward form except that the guide tubes do not have the interlocking bearing pads. A fuel element is shown in FIGS. 3, 4 and 5. Each fuel element comprises a cluster of fuel pins (not shown) enclosed by a wrapper of hexagonal cross-section and designated 5 in FIG. 3. The fuel element has a lower spike 6 which is engageable with a socket associated with a diagrid, for example, as in the manner described in U.S. Pat. No. 3,383,287 whereby the fuel elements are disposed generally upright. The elements types X Y which are arranged to tilt have resilient spikes 6 and the tilt is achieved in conventional manner as disclosed in U.S. Pat. No. 3,383,287 by eccentrically in the diagrid sockets. The rigidly supported element type Z, of course, has a substantially rigid spike 6. The upper end region of the element has a cylindrical portion 7 and the transition from circular section to hexagonal section is effected by a hexagonal taper 8. The transition from hexagonal section to circular section at the lower end region of the element is effected by a circular taper 9. Immediately above the circular taper there is a group of rib like extended corner features or splines 10 projecting outwardly as shown in FIG. 4. Intermediate the ends of the element there are bearing pads 11 in the form of spline like ribs 11a on each side of the wrapper 5. Each pad 11 comprises one full width and one half width ribs 11a which can interlock with co-operating ribs and half width ribs 11a on adjacent fuel elements as shown in FIG. 2. A single bearing pad 11 is shown in FIG. 6 the ribs 11a having taper lead in surfaces 11b and 11c at each end.

When a fuel element is being loaded into a reactor core in the presence of installed fuel elements, the fuel element is suspended and lowered to enter the spike 6 alongside the upper cylindrical portion 7 of an installed adjacent element. Further lowering brings the circular taper 9 in contact with a side of the hexagonal taper 8 of the adjacent element so that the fuel element is displaced sideways generally into its correct azimuthal position relative to the centre of the cluster of components. By further lowering of the fuel element the extended corner features 10 abut the sloping hexagonal tapers 8 of the adjacent element and the reaction between the corner features and the adjacent element causes rotation of the element to a position such that the bearing pads 11 will pass between adjacent fuel element wrappers 5, and the wrapper 5 of the suspended element will pass between the pads 11 on adjacent elements. When the fuel element is lowered sufficiently to engage the lower ends of the ribs 11a with the upper ends of the ribs 11a of adjacent elements, the taper lead in surfaces 11b of the ribs assist in radial and fine rotational adjustment of the fuel element, and the taper surfaces 11a assist in radial alignment, to engage the ribs accurately so that the fuel element can be fully lowered and spiked into the diagrid. The interlocking ribs 11a of the bearing pads 11 accurately locate all the components of the cluster and lateral slip of the components is reduced to very small limits.

Figure 7:
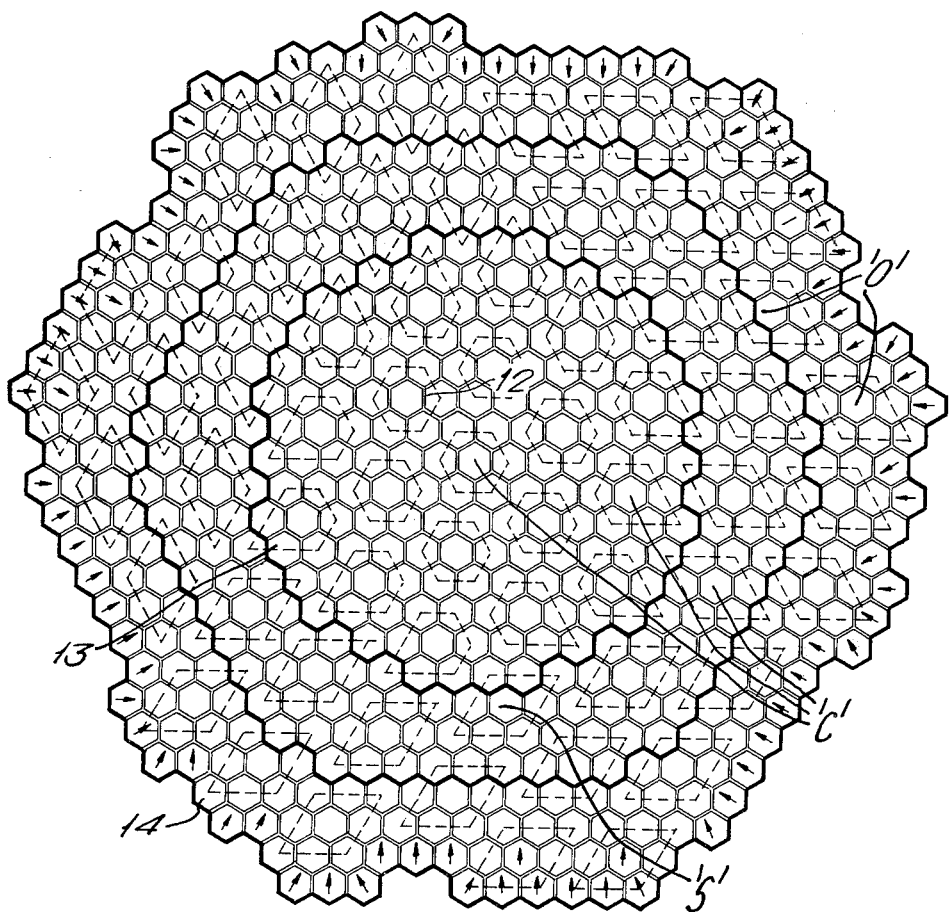
FIG. 7 is a diagrammatic plan view of a second construction of nuclear reactor core.
Figure 8:
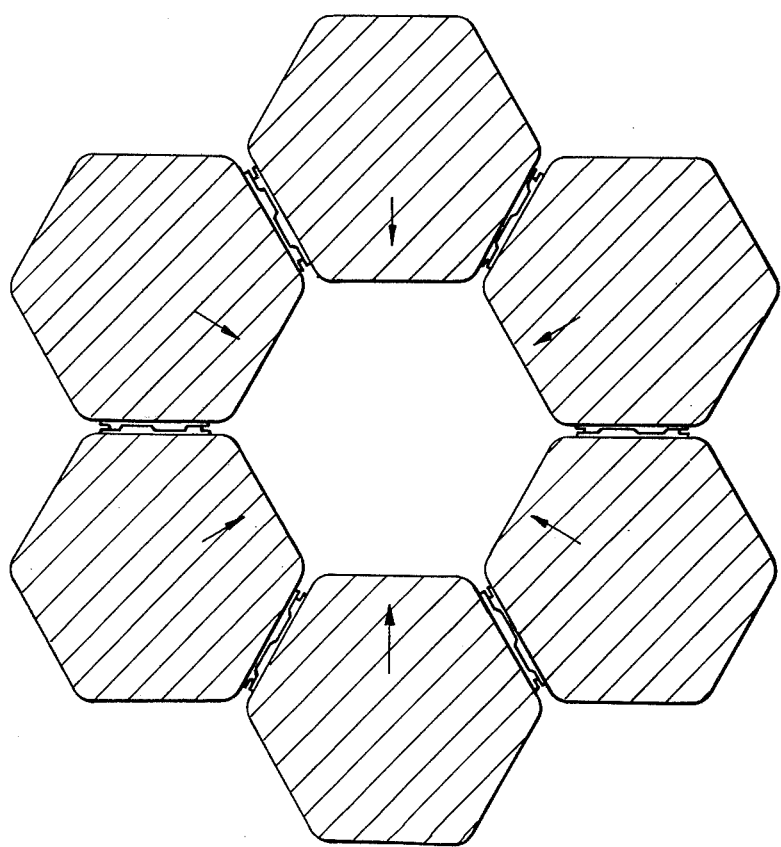
FIG. 8 is a detail of FIG. 7 drawn to a larger scale.

The second construction of nuclear reactor shown in FIGS. 7 and 8 is generally similar to the first construction except that fuel elements only are arranged generally in clusters of six, each resiliently tilted towards a central void to form a circular arch. The central void can be occupied by a free standing control rod or shut down rod guide tube. In FIG. 7 some of the control rod and shut down rod guides tubes are shown and again designated 'C' and 'S' respectively, but in the breeder zone some of the voids are left vacant some examples being designated 'O'. A basic module 12 of six fuel element is enlarged in some regions, for example, the module designated 13 has an additional fuel element appended to it and the module designated 14 has two additional fuel elements appended to it. The appended fuel elements are arranged to tilt towards the centre of the basic cluster.

I claim:
1. A nuclear reactor core comprising
   an array of closely packed elongate components, the components being arranged in groups with their longitudinal axes generally vertical,
   support means for the array of components,
   means for arranging at least some of the components of each group so that they tilt towards the centre of their respective group wherein at least some of the components of the group are urged laterally into abutment with one another, at least some of the components being nuclear fuel elements having interengaging splined bearing pad means intermediate their ends for resisting relative lateral movement of two adjacent fuel elements.

2. A nuclear reactor core according to claim 1 wherein the components comprise fuel elements and control rods and are generally arranged in modules, each module comprising a cluster of four components at least three of which are fuel elements, one fuel element being rigidly supported whilst the remaining components are resiliently tilted towards the centre of the cluster to lean on the rigidly supported element.

3. A nuclear reactor core according to claim 1 wherein the fuel elements are arranged in modules, each module comprising a cluster of six fuel elements, each resiliently tilted towards a central void to form a circular arch.

4. A nuclear reactor core according to claim 3 wherein at least some of the modules have additional fuel elements disposed outside the clusters and resiliently tilted towards the central voids.

5. A nuclear reactor core according to claim 3 wherein the central voids of at least some of the modules accommodate control rods.

6. A nuclear reactor fuel element comprising:
   a cluster of parallel fuel pins, a peripheral wrapper of hexagonal cross-section enclosing the fuel pins, the wrapper having bearing pads for abutment with corresponding pads of similar fuel elements, the bearing pads being disposed on each side of the wrapper intermediate the ends of the wrapper, the bearing pads being in the form of spline like ribs extending parallel to the longitudinal axis of the fuel element and interengagable with complementary ribs of pads of similar fuel elements.

7. A nuclear reactor fuel element according to claim 6 wherein the spline like ribs of the bearing pads have taper lead-in surfaces at each end at least on one side and on their faces.

8. A nuclear reactor fuel element according to claim 7 wherein the wrapper has a correspondingly hexagonal taper in an end region which is uppermost when the element is in a nuculear reactor core and a circular taper at a lower end region of the wrapper, and a groups of rib like corner features disposed above and adjacent the conical taper.

* * * * *